United States Patent
Delis et al.

[19]

[11] Patent Number: 6,119,001
[45] Date of Patent: Sep. 12, 2000

[54] ROAMER SERVICE AUTO-ACTIVATION AND DEACTIVATION IN A HOME LOCATION REGISTER

[75] Inventors: Michael Delis, Ville St-Laurent; Duncan Cameron, Montreal, both of Canada

[73] Assignee: Telefonaktiebolaget LM Ericsson (publ), Stockholm, Sweden

[21] Appl. No.: 08/847,918

[22] Filed: Apr. 28, 1997

[51] Int. Cl.[7] ....................................................... H04Q 7/38
[52] U.S. Cl. ......................... 455/433; 455/465; 455/418; 455/419; 455/457; 455/426; 455/408
[58] Field of Search .................................... 455/465, 433, 455/418, 419, 457, 426, 406, 408

[56] References Cited

U.S. PATENT DOCUMENTS

| | | | |
|---|---|---|---|
| 5,319,699 | 6/1994 | Kerihuel et al. | 455/461 |
| 5,353,340 | 10/1994 | Kunz | 455/432 |
| 5,564,068 | 10/1996 | Nguyen | 455/433 |
| 5,603,084 | 2/1997 | Henry, Jr. et al. | 455/419 |
| 5,610,973 | 3/1997 | Comer | 455/413 |
| 5,625,887 | 4/1997 | Cassidy et al. | 455/509 |
| 5,724,658 | 3/1998 | Hasan | 455/445 |
| 5,771,381 | 6/1998 | Jones et al. | 395/653 |
| 5,819,178 | 10/1998 | Cropper | 455/433 |

FOREIGN PATENT DOCUMENTS

| | | |
|---|---|---|
| 0 379 642 | 9/1989 | European Pat. Off. . |
| 2 304 497 | 8/1995 | United Kingdom . |
| WO 93/07566 | 4/1993 | WIPO . |
| WO 96/13954 | 5/1996 | WIPO . |
| WO 98/08354 | 2/1998 | WIPO . |

OTHER PUBLICATIONS

PCT International Search Report, Nov. 3, 1998, PCT/SE 98/00574.

*Primary Examiner*—William G. Trost
*Assistant Examiner*—Sonny Trinh
*Attorney, Agent, or Firm*—Jenkens & Gilchrist, P.C.

[57] ABSTRACT

An automatic activation of a roamer mobile station is implemented in a visited network home location register. Responsive to a registration attempt by the roamer mobile station a default subscriber profile is defined, and a temporary subscriber (directory) number is assigned. Arrangements are also made to insure subscriber payment for any network provided wireless telephone services. Following activation of the roamer mobile station, the default subscriber profile is downloaded for use in providing service. A timer is also started and thereafter monitored for expiration. If the timer expires before the occurrence of a wireless telephone service traffic event involving the roamer mobile station, automatic deactivation of the roamer in the home location register is implemented. In this regard, the default subscriber profile is deleted and the temporary subscriber (directory) number is returned. The billing account for any network provided wireless telephone services is also closed.

6 Claims, 4 Drawing Sheets

ROAMER SERVICE AUTO-ACTIVATION AND DEACTIVATION IN A HOME LOCATION REGISTER

BACKGROUND OF THE INVENTION

1. Technical Field of the Invention

The present invention relates to cellular communications networks and, in particular, to the activation of roamer mobile station service in a home location register of a visited network.

2. Description of Related Art

Those persons who subscribe to wireless telephone service do so primarily because of the provided mobility advantage. With a cellular telephone subscription, a subscriber is freed from fixed wireline connections, and may move about a home service area covered by the cellular service provider to make and receive telephone calls. The number of persons owning mobile stations has dramatically increased in recent years. Furthermore, an increasing number of geographic areas now have access to wireless telephone service. With these increases in users and service availability, there also exists an increasing number of opportunities for subscribers to then use their mobile stations not only in their home service area, but also when traveling in areas where wireless telephone service is provided through other service providers. In such situations, the subscriber is referred to as a "roamer".

To facilitate the provision of wireless telephone service to roamers, cellular service providers enter into billing and other reciprocity service agreements which allow a subscriber to roam among and between those service areas and still make and receive telephone calls. The process of roamer registration pursuant to agreement with the system of a visited service area often occurs in a manner transparent to the subscriber. Even absent of the existence of a reciprocity service agreement, a roamer may still obtain wireless telephone service in a visited service area by making appropriate billing arrangements directly with the service provider. In each case, the subscriber must be defined (with a service profile) and connected (with the assignment of a roaming directory number) in the home location register of the visited service area. These definition and connection processes, unfortunately, are made in accordance with the prior art using manual administrative procedures. The inconvenience of requiring administrative intervention makes roamer service less convenient and desirable.

There is a need then for the automatic definition and connection of the roaming subscriber in the home location register of the visited service area to provide for more convenient access to roamer service.

SUMMARY OF THE INVENTION

Responsive to an initial registration attempt by a roamer mobile station in a visited wireless telephone network, a procedure is implemented to automatically activate the roamer in the home location register for authorized communication. The activation procedure involves defining the roamer mobile station with a default subscriber profile, and connecting the roamer mobile station with a temporary subscriber (directory) number. Arrangements are also made to ensure subscriber payment for any network provided wireless telephone services. The default subscriber profile is then downloaded from the home location register in connection with the provision of wireless telephone service to the roamer.

Following activation of the roamer mobile station, a timer is started and thereafter monitored for expiration. If the timer expires before the occurrence of a wireless telephone service traffic event regarding the roamer mobile station, the procedure automatically deactivates the roamer in the home location register. The deactivation procedure involves deleting the default subscriber profile, returning the temporary subscriber (directory) number, and closing the billing account for any network provided wireless telephone services.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
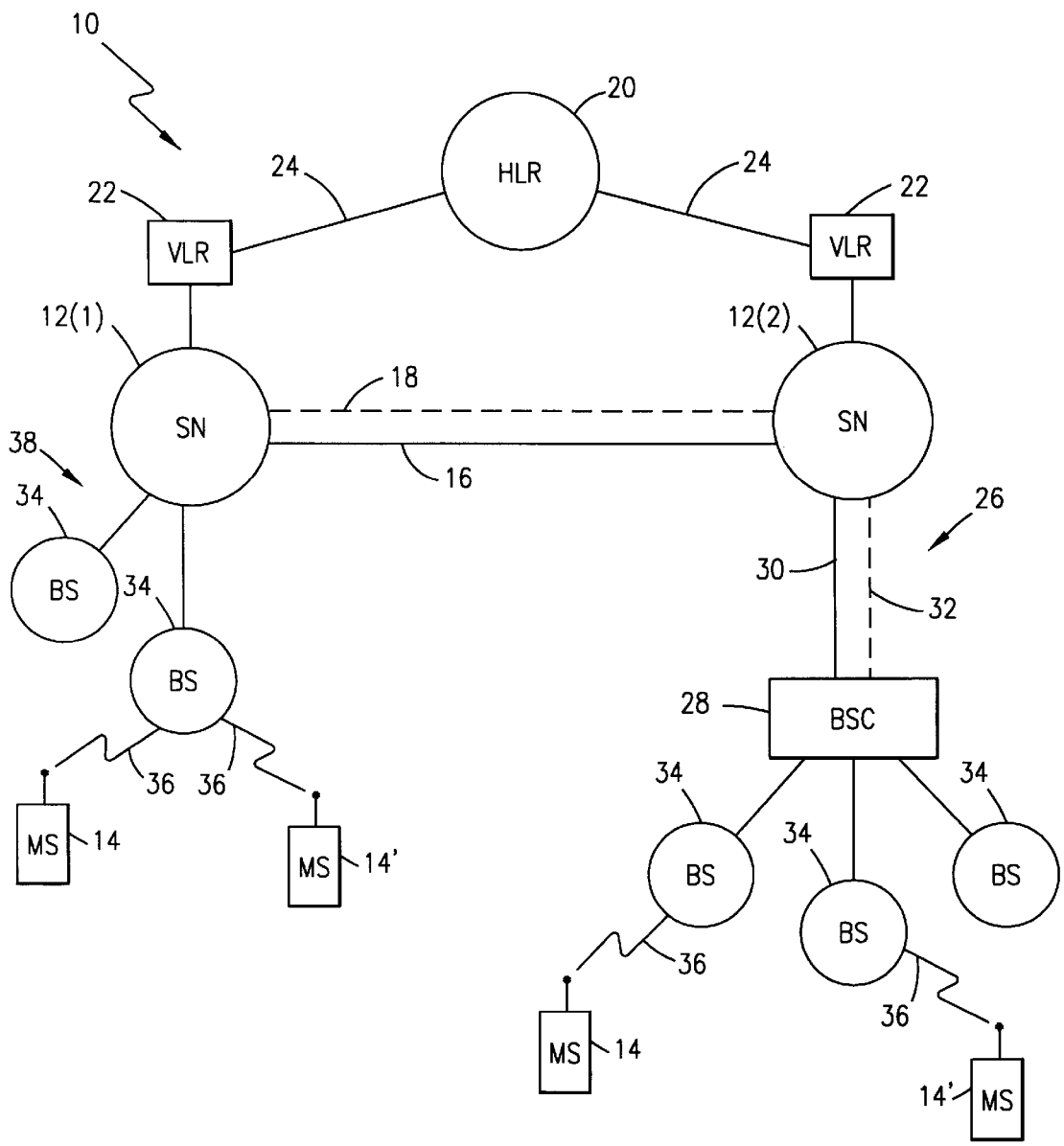
FIG. 1 is a schematic diagram of a cellular telephone network in which the present invention may be implemented.

Reference is now made to FIG. 1 wherein there is shown a schematic diagram of a wireless telephone network 10 providing wireless (cellular) telephone service within a given service area. The network 10 includes a plurality of interconnected switching nodes (SNs) 12 (also referred to as mobile switching centers—MSCs). Although only two switching nodes 12 are shown, it will be understood that the network 10 likely includes many more interconnected nodes. The first and second switching nodes 12(1) and 12(2) may comprise any one of a number of known telecommunications switching devices, including those commonly used and known in the art for providing either digital or analog cellular telephone service to a plurality of mobile stations (MS) 14. The switching nodes 12 are interconnected with each other for communication via both voice trunks 18 (illustrated with broken lines) and signaling links 16 (illustrated with solid lines) providing a known ISUP (or R1 or R2) type connection. The voice trunks 18 provide voice and data communications paths used to carry subscriber communications between the switching nodes 12. The signaling links 16 carry command signals between the switching nodes 12. These signals may be used, for example, in setting up and tearing down voice and data communications links over the voice trunks 18 and controlling the provision of calling services to the mobile stations 14.

Each switching node 12 is also connected to a home location register (HLR) 20 through an associated visitor location register (VLR) 22 by means of a signaling link 24 providing a known Mobile Application Part (MAP) or IS-41 type connection. The switching node and visitor location register may be co-located as a combined MSC/VLR. The home location register 20 stores information relating to the mobile stations 14 and their subscriptions comprising location information and service profile information. This information is stored by the home location register 20 in association with the subscriber (directory) number (SNB) and mobile identification number (MIN) for the mobile station 14. The home location register 20 further supports a plurality of temporary subscriber (directory) numbers (TSNBs) which are assigned and allocated on an as needed and temporary basis to established (defined and connected) roaming mobile stations 14' (i.e., roamers).

In one cellular telephone network implementation, illustrated generally at 26, the switching node 12 is further connected to at least one associated base station controller (BSC) 28 via both a signaling link 30 and a voice trunk 32. Only one base station controller 28 is shown connected to switching node 12(2) in order to simplify the illustration. The voice trunk 32 provides a voice and data communications path used to carry subscriber communications between the second switching node 12(2) and its base station controller 28. The signaling link 30 carries command signals between the node 12 and its associated base station controller 28. The signaling link 30 and trunk 32 are collectively commonly referred to in the art as the "A interface". The base station controller 28 is then connected to a plurality of base stations (BS) 34 which operate to effectuate radio frequency communications with proximately located mobile stations 14 over an air interface 36. The base station controller 28 functions in a well known manner to control this radio frequency communications operation.

In another cellular telephone network implementation, illustrated generally at 38, the switching node 12(1) is further connected to a plurality of base stations (BS) 34 which operate to effectuate radio frequency communications with proximately located mobile stations 14 over the air interface 36. In this implementation, the functionality provided by the base station controller 28 (see, generally at 26) is instead provided by the switching node 12.

Although direct communications links (signaling and/or trunk) between the nodes are illustrated in FIG. 1, it is understood by those skilled in the art that the links are not necessarily direct between the illustrated nodes, and may instead pass through many other communications nodes (not shown) of the mobile network, and perhaps even utilize other communications networks (such as the public switched telephone network—PSTN). Illustration of the links in a "virtual" manner as shown in FIG. 1 is therefore by way of simplification of the drawing and the communications relationship between the various included nodes within the network 10.

Figure 2A:
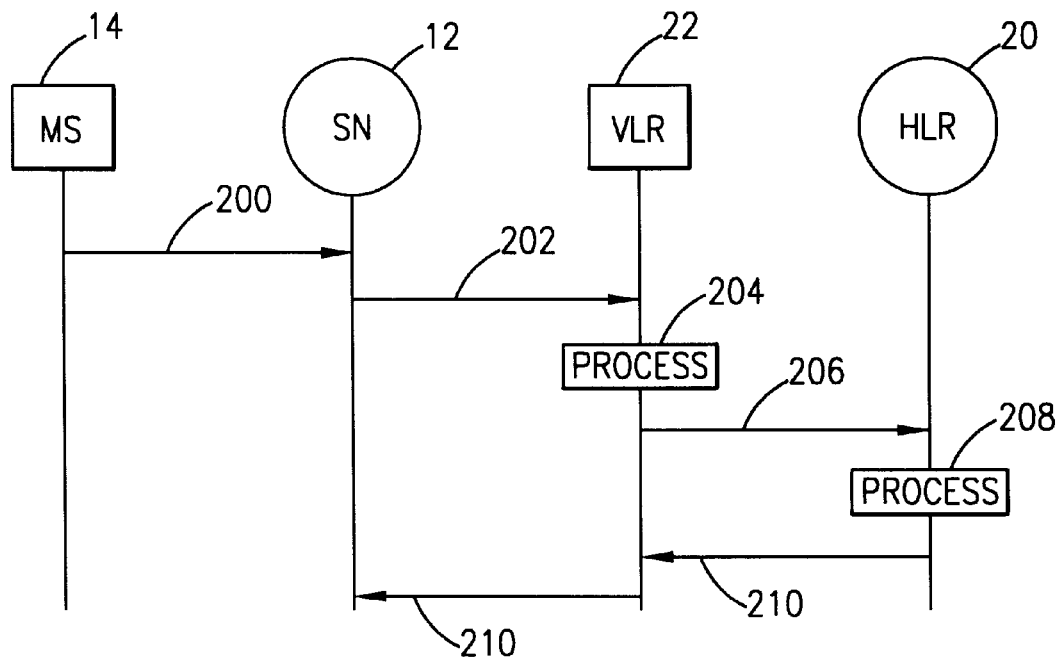
FIGS. 2A and 2B are signal flow and node operation diagrams illustrating operation of the cellular telephone network of FIG. 1 in a prior art manner for responding to a mobile station registration.
Figure 2B:
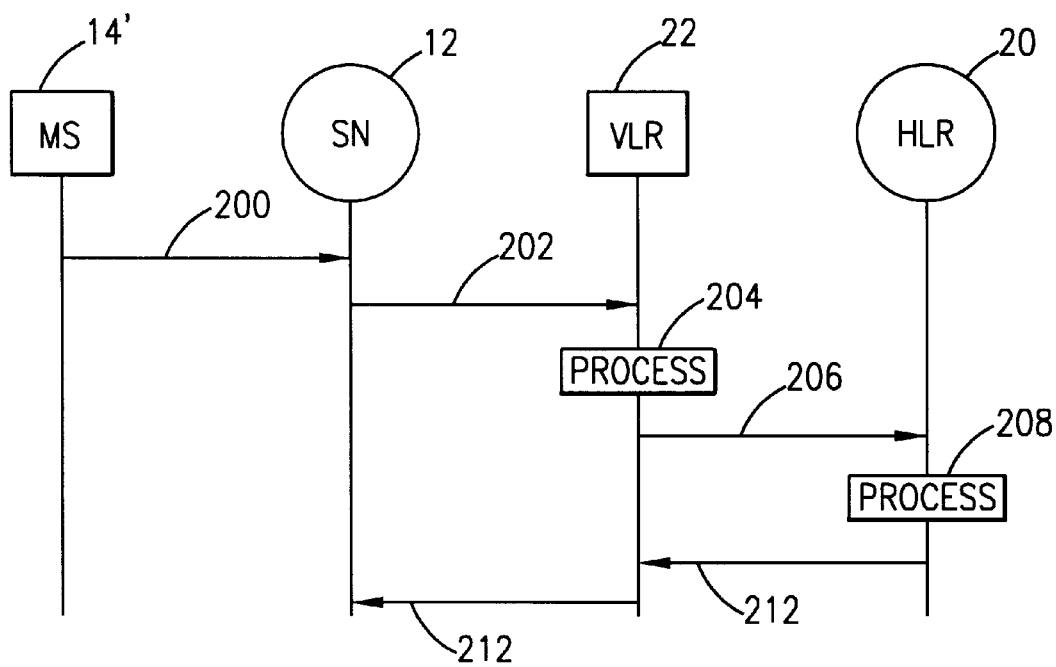

Reference is now made to FIGS. 1, 2A and 2B wherein FIGS. 2A and 2B are a signal flow and node operation diagrams illustrating operation of the cellular network of FIG. 1 in a prior art manner for responding to a mobile station registration.

Turning first specifically to FIG. 2A, registration of a mobile station 14 with a network 10 serving its home service area is initiated with the mobile station 14 transmitting a registration message 200 to the serving switching node 12 over the air interface 36 and through the serving base station 34 (perhaps also through the serving base station controller 28). Responsive thereto, the switching node 12 sends a registration notification (or qualification request) message 202 to the visitor location register 22. The message 202 includes the mobile identification number (MIN) of the mobile station 14, which is then processed (action 204) by the data base to determine whether the subscriber profile for the corresponding mobile station 14 is already present. If not, the visitor location register forwards the registration notification (or qualification request) message 206 to the home location register 20. Again, this message 206 includes the mobile identification number (MIN) of the mobile station 14, which is then processed (action 208) by the data base to determine whether the subscriber is recognized. In this case, the subscriber is recognized (note that this is a registration in the home service area), and the subscriber profile for the mobile station 14 is retrieved from the data base and transmitted by a registration notification (or qualification request) return result message 210 back to the visitor location register 22 for storage, with the message forwarded on to the switching node 12 to confirm provision of service to the mobile station 14. Other known actions, for example, involving the authentication of the mobile station, also occur in connection with the registration process, but are not specifically illustrated.

Turning next to FIG. 2B, registration of a roaming mobile station 14' with a network 10 serving a visited service area is initiated with the mobile station 14' transmitting a registration message 200 to the serving switching node 12 over the air interface 36 and through the serving base station 34 (perhaps also through the serving base station controller 28). Responsive thereto, the switching node 12 sends a registration notification (or qualification request) message 202 to the visitor location register 22. The message 202 includes the mobile identification number (MIN) of the mobile station 14', which is then processed (action 204) by the data base to determine whether the subscriber profile for the corresponding mobile station 14' is already present. If not, the visitor location register 22 forwards the registration notification (or qualification request) message 206 to the home location register 20. Again, this message 206 includes the mobile identification number (MIN) of the mobile station 14', which is then processed (action 208) by the data base to determine whether the subscriber is recognized. In this case, the subscriber is not recognized (note that this is a roamer registration in the visited service area). An error message 212 indicating that the mobile station 14' mobile identification number is not recognized by the home location register 20 is then transmitted back to the visitor location register 22, and forwarded on to the switching node 12. The unrecognized roamer mobile station 14' is thus denied wireless telephone service.

Figure 3:
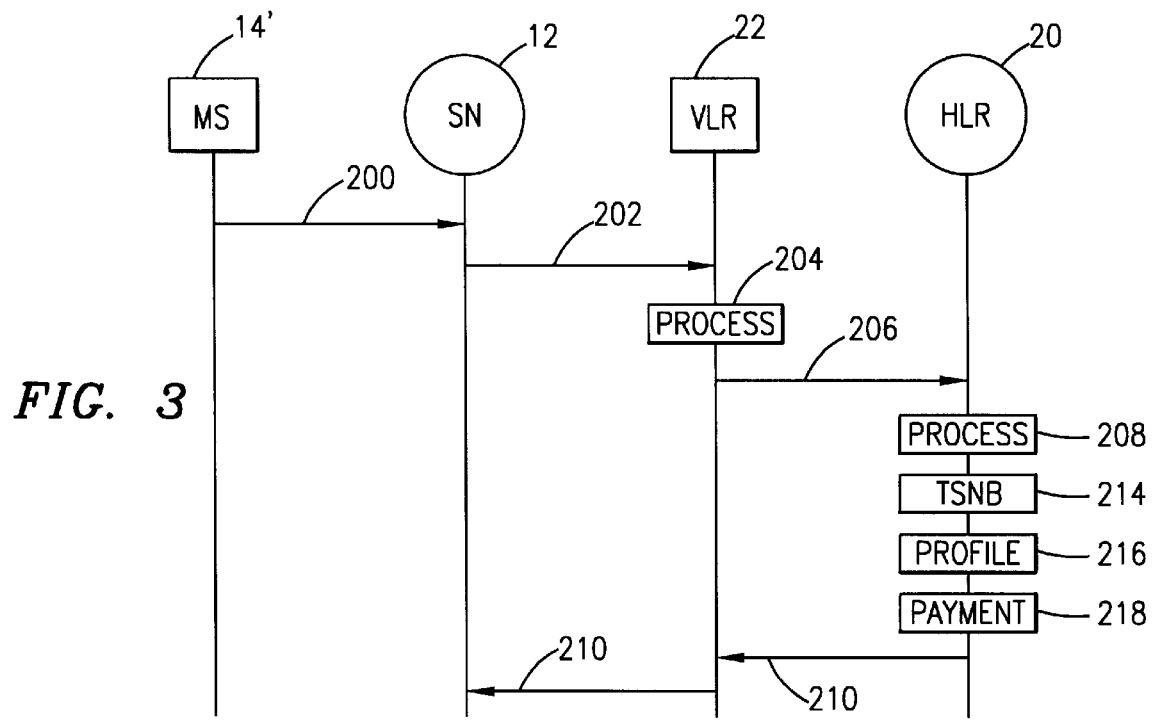
FIG. 3 is a signal flow and node operation diagram illustrating operation of the cellular telephone network of FIG. 1 in accordance with the present invention for implementing an auto-activation of roamer service.

Reference is now made to FIG. 3 wherein there is shown a signal flow and node operation diagram illustrating operation of the cellular telephone network of FIG. 1 in accordance with the present invention for implementing an auto-activation of roamer service. A roaming mobile station 14' present within a visited service area transmits a registration message 200 to the serving switching node 12 over the air interface 36 and through the serving base station 34 (perhaps also through the serving base station controller 28). Responsive thereto, the switching node 12 sends a registration notification (or qualification request) message 202 to the visitor location register 22. The message 202 includes the mobile identification number (MIN) of the mobile station 14', which is then processed (action 204) by the data base to determine whether the subscriber profile for the corresponding mobile station 14' is already present. If not, the visitor location register 22 forwards the registration notification (or qualification request) message 206 to the home location register 20. Again, this message 206 includes the mobile identification number (MIN) of the mobile station 14', which is then processed (action 208) by the data base to determine whether the subscriber is recognized. In this case, the subscriber is not recognized (note that this is a first roamer registration in the visited service area).

Instead of sending the error message 212, as in FIG. 2B, indicating that the mobile station 14' mobile identification number is not recognized, the home location register 20 recognizes that this is a roamer first registration and initiates an activation procedure for automatically defining and connecting the roaming subscriber within the network 10. This activation procedure includes, as one action 214, the selection of a temporary subscriber number (TSNB) for the mobile station. This selection is made from a pool of available temporary subscriber numbers assigned to the home location register 20. Another action 216 taken is the defining of a service profile for the subscriber. This service profile typically comprises a default service profile. The default is basic wireless telephone service without any special subscriber features (like call waiting) and without any special charging arrangements (such as reduced charges for certain calls types or times). Yet another action 218 taken is arranging for insured payment by the subscriber for any charges incurred during the provision of wireless telephone service. Although not specifically illustrated, this action may comprise having the subscriber enter a credit card number, connecting the mobile station with an operator to collect billing information, or extracting billing information from a subscriber identity module (SIM) card (not shown) attached to the mobile station 14'.

Once the actions 214, 216 and 218 are completed, the subscriber is recognized in the home location register 20, and the default subscriber profile for the mobile station 14' is retrieved from the data base and transmitted by the registration notification (or qualification request) return result message 210, as in FIG. 2A, back to the visitor location register 22 for storage, with the message forwarded on to the switching node 12 to confirm provision of service to the mobile station 14. Other known actions, for example, involving the authentication of the mobile station, also occur in connection with the registration process, but are not specifically illustrated.

It should be recognized now that if the roamer mobile station 14' should thereafter make another registration, or if a traffic event relating to the mobile station 14' should thereafter occur, the mobile station is defined in the network 10 with a service profile and a temporary subscriber number. Accordingly, provision of wireless telephone service to the roamer mobile station 14' in accordance with the default subscriber profile is provided. Specifically, paging, call origination and call delivery requests made to the home location register relating to the mobile station 14' will be recognized. Furthermore, subsequent registrations by the roamer mobile station 14' through a different switching node 12 will be recognized and service will be granted.

Figure 4:
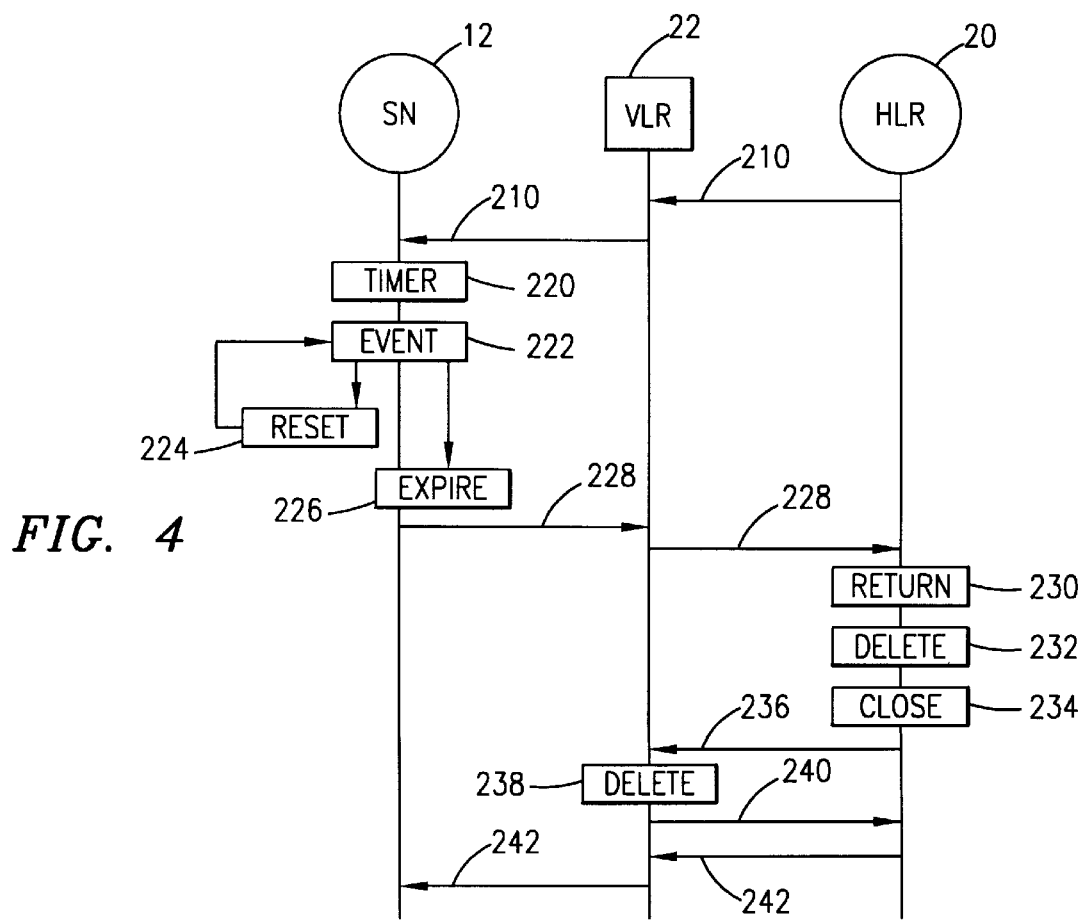
FIG. 4 is a signal flow and node operation diagram illustrating operation of the cellular telephone network of FIG. 1 in accordance with the present invention for implementing an auto-deactivation of roamer service.

Reference is now made to FIG. 4 wherein there is shown a signal flow and node operation diagram illustrating operation of the cellular telephone network of FIG. 1 in accordance with the present invention for implementing an auto-deactivation of roamer service. Responsive to receipt of the registration notification (or qualification request) return result message 210 for the roamer mobile station 14', the switching node 12 starts a timer (action 220). The switching node 12 then waits for a traffic event 222 regarding the mobile station 14' to be initiated. Such an event may comprise, for example, an incoming call delivery to the mobile station 14', the instigation of an outgoing call from the mobile station, or a re-registration within the network 10 by the mobile station (through the same or a different switching node). Responsive to such an event 222, the switching node 12 re-sets (action 224) the timer. If the timer should expire (action 226) before an event 222 occurs, the switching node 12 sends a mobile station inactive message 228 through the visitor location register 22 to the home location register 20. Responsive to this message 228, the home location register recognizes that the message relates to a roamer, and then initiates a deactivation procedure for automatically un-defining and disconnecting the roaming subscriber within the network 10. This deactivation procedure includes, as one action 230, the returning of the assigned temporary subscriber number (TSNB) to the pool of available temporary subscriber numbers assigned to the home location register 20. Another action 232 taken is to delete the service profile for the subscriber. Yet another action 234 taken is to close the billing account for the roamer mobile station 14'. A registration cancellation message 236 is then sent by the home location register 20 to the visitor location register 22. Responsive thereto, the visitor location register deletes (action 238) the previously downloaded default subscriber profile for the roamer mobile station 14'. A registration cancellation return result message 240 is then sent back up the home location register 20 to confirm deletion of the subscriber profile. The home location register 20 then sends a mobile station inactive return result message 242 back through the visitor location register 22 to the switching node 12 confirming the inactive status of the roamer mobile station 14'.

Although the timer is illustrated as being implemented in connection with the switching node 12, it will be understood that a separate nodal functionality could be implicated to effectuate the timer functionality. Furthermore, although the timer is illustrated as being reset following the occurrence of an event, it will be understood that an absolute timer functionality could be implemented where activated roamer service is provided for only a fixed, non-extendable period of time. Once the timer expires, a new registration and automatic activation must occur with respect to the roamer service.

Figure 5:
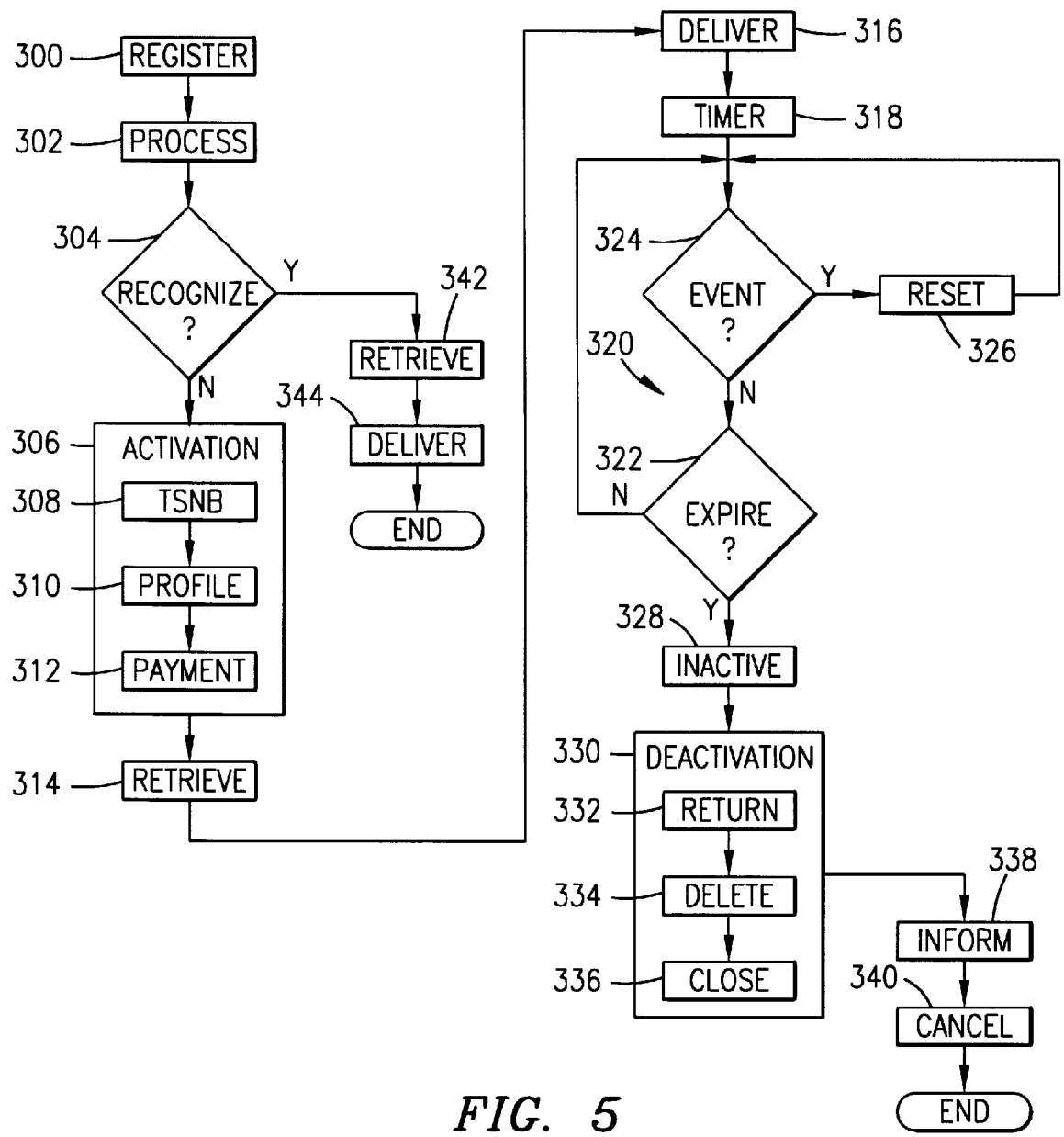
FIG. 5 is a flow diagram for the auto-activation and auto-deactivation processes of the present invention.

Reference is now made to FIG. 5 wherein there is shown a flow diagram for the auto-activation and auto-deactivation process of the present invention. In a first step 300, a roaming mobile station 14' present within a visited service area registers with the home location register 20. The mobile identification number (MIN) of the mobile station 14', which is then processed in step 302 by the home location register 20 to determine whether the subscriber is recognized. If the subscriber is not recognized in decision step 304, the activation procedure step 306 for automatically defining and connecting the roaming subscriber within the network 10 is performed. This procedure 306 involves the selection of a temporary subscriber number (TSNB) for the mobile station in step 308, the defining of a service profile for the subscriber in step 310, and the arranging for insured payment by the subscriber for any charges incurred during the provision of wireless telephone service in step 312. The default subscriber profile for the mobile station 14' is then retrieved from the home location register 20 in step 314, and delivered to the visitor location register 22 (with confirmation of service to the switching node) in step 316. Other known actions, for example, involving the authentication of the mobile station, also occur in connection with the registration process, but are not specifically illustrated.

A timer is then started by the switching node 12 in step 318. The procedure then loops in path 320 awaiting either a time out of the timer (as determined in decision step 322) or a traffic event involving the mobile station 14' (as determined in decision step 324). The portion of the loop relating to the detection of an event to reset the timer may optionally be ignored to implement an absolute timer functionality. If a traffic event occurs, the timer is re-set in step 326. If the timer expires (step 322) before being re-set (step 326) by a traffic event, a mobile station inactive message is sent in step 328 by the switching node 12 to the home location register 20. The home location register recognizes that this message relates to roamer mobile station 14', and a deactivation procedure step 330 for automatically un-defining and disconnecting the roaming subscriber within the network 10 is initiated. This procedure 330 involves the returning of the assigned temporary subscriber number (TSNB) in step 332, the deletion of the service profile for the subscriber in step 334, and the closing of the billing account for any charges incurred during the provision of wireless telephone service in step 336. The visitor location register 22 is then informed in step 338 of the cancellation of the roamer mobile station 14' registration, and the subscriber profile stored therein is deleted in step 340.

If the roamer mobile station 14' subscriber is, however, recognized in decision step 304, this is indicative of the fact that the activation procedure in step 306 for automatically defining and connecting the roaming subscriber within the network 10 has already been successfully performed (perhaps even through a different switching node). The default subscriber profile for the mobile station 14' is then retrieved from the home location register 20 in step 342, and delivered to the visitor location register 22 (with confirmation of service to the switching node) in step 344. Other actions, for example, involving the authentication of the mobile station, also occur in connection with the registration process, but are not specifically illustrated.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A switching node for use in a wireless telephone system, the switching node receiving an indication of temporary-activated wireless telephone service for a roamer mobile station and responding thereto by:

starting a timer following the activation of wireless telephone service for the roamer mobile station in said wireless telephone system;

monitoring for traffic events concerning the roamer mobile station, said traffic events occurring in said wireless telephone system;

resetting the timer if a traffic event is monitored in said wireless telephone system; and ordering deactivation of wireless telephone service in said wireless telephone system for the roamer mobile station if the timer expires.

2. A method for monitoring a temporary-activated subscription for a roamer mobile station in a visited wireless telephone network, comprising the steps of:

starting a timer following the temporary-activation of wireless telephone service for the roamer mobile station in said visited wireless telephone network;

monitoring for traffic events concerning the roamer mobile station and occurring in said visited wireless telephone network;

resetting the timer if a traffic event is monitored; and deactivating wireless telephone service for the roamer mobile station in said visited wireless telephone network if the timer expires.

3. The method as in claim 2 wherein the visited wireless telephone network comprises a switching node and a home location register, and the steps of starting, monitoring and resetting are performed by the switching node, and the step of deactivating is performed by the home location register.

4. The method as in claim 2 wherein the step of deactivating comprises the steps of:

deleting the default subscriber profile for the roamer mobile station; and returning the assigned temporary subscriber number for the roamer mobile station.

5. The method as in claim 4 wherein the step of deactivating further comprises the step of closing billing for the wireless telephone services provided to the roamer mobile station.

6. The method as in claim 4 wherein the visited wireless telephone network comprises a home location register and a visitor location register, and wherein the step of deleting comprises the steps of:

deleting the default subscriber profile for the roamer mobile station from the home location register; and deleting the default subscriber profile for the roamer mobile station from the visitor location register.

* * * * *